United States Patent
Wagner

[15] 3,696,721
[45] Oct. 10, 1972

[54] AUTOMATIC DISTANCE WARNING CIRCUITS FOR CAMERAS TO BE USED WITH PHOTOFLASH UNITS

[72] Inventor: Karl Wagner, Ottobrunn, Germany
[73] Assignee: AGFA-Gevaert Aktiengesellschaft, Leverkusen, Germany
[22] Filed: Feb. 19, 1971
[21] Appl. No.: 116,757

[30] Foreign Application Priority Data
Feb. 27, 1970  Germany..........P 20 09 267.5

[52] U.S. Cl. ...................................95/11 R, 95/10 C
[51] Int. Cl. ..............................................G03b 17/18
[58] Field of Search......95/11 R, 11 V, 11.5 R, 10 C, 95/10 CT

[56] References Cited

UNITED STATES PATENTS

| | | |
|---|---|---|
| 2,901,671 | 8/1959 | Most......................95/11.5 R |
| 3,429,244 | 2/1969 | Von Wasielewski ....95/10 CT |
| 3,498,192 | 3/1970 | Tadashi Ito et al.....95/11 R X |

*Primary Examiner*—Robert P. Greiner
*Attorney*—Michael S. Striker

[57] ABSTRACT

A voltage divider connected to the base of one transistor of a trigger stage has the ratio changed in dependence on the setting of the focusing ring. When the distance is too small or too great to adequately expose a photoflash picture, the trigger stage switches, causing a lamp to light up as a warning to the user.

16 Claims, 5 Drawing Figures

INVENTOR
KARL WAGNER

AUTOMATIC DISTANCE WARNING CIRCUITS FOR CAMERAS TO BE USED WITH PHOTOFLASH UNITS

BACKGROUND OF THE INVENTION

The invention relates to circuits for cameras to be used with photoflash units, the unit either being built into the camera or else mountable on the camera by means of a shoe. A circuit enables the flash unit to be made ready for flashing. The camera includes means for indicating whether the subject distance is suitable for a photoflash picture.

An arrangement of this kind is disclosed in the German Petty Pat., No. 1,955,756. A cam coupled to the focusing means so controls the electric contact through a lever arrangement that at the beginning or end of the cam the indicating means is operated. This known arrangement has the disadvantage that, for example, the upper and lower distance limits cannot be adjusted in dependence on the emulsion speed.

SUMMARY OF THE INVENTION

An object of the invention is to provide a simple and inexpensive arrangement for warning the user when the subject distance is not suitable to take a photoflash picture.

A further object of the invention is the arrangement of the preceding object that avoids the aforesaid disadvantage.

A still further object of the invention is the arrangement of the preceding objects, which arrangement is made of electrical components.

The invention consists essentially of electronic trigger means with control electrode means and an output, the trigger means having first and second states; focusing means, voltage divider means connected between two different voltages, the voltage divider means including at least an adjustable first resistor means and a second resistor means, coupling means for mechanically connecting the first resistor means to the focusing means so that the resistance of the former has a value dependent on the setting of the latter, warning indicating means connected to the electronic trigger means output and operated when the trigger means is in the second state, and means electrically connecting the adjustable first resistor means to the control electrode means of the electronic trigger means so that the voltage at the control electrode means varies in dependence on the resistance of the adjustable first resistor means and consequently on the setting of the focusing means so as to trigger the electronic trigger means to the second state when the focusing means is set at a distance at which the photoflash unit cannot adequately illuminate the subject, whereby the indicating means is automatically operated to warn the user.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1A:
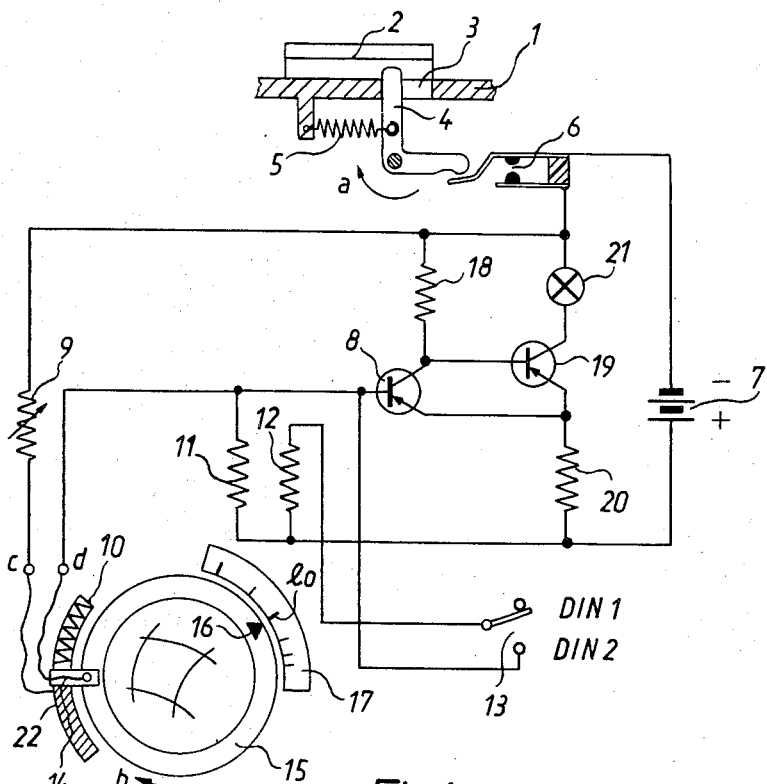
FIG. 1a is a wiring diagram of one embodiment of the invention.

With reference to FIG. 1a, a shoe 2 for a photoflash unit, not shown, is mounted on the top 1 of the camera. A lever 4, biased by a spring 5, projects through an opening 3 located in the top 1 near to the shoe 2. The lever 4 operates a contact 6, which connects a voltage source 7 to a trigger stage. The trigger stage comprises two transistors 8 and 19, the base of the former transistor being connected to a voltage divider composed of two adjustable resistors 9 and 10 and of a fixed resistor 11. In accordance with the invention, the trigger stage can also be composed, for example, of a controlled rectifier, of a thyristor, or of a unijunction transistor.

A further resistor 12 can be shunted across the resistor 11 by a switch 13. When the resistor 12 is switched out of the circuit, the emulsion speed of the film is greater than it is when the resistor 12 is in the circuit. In FIG. 1a, the higher emulsion speed is denoted by DIN 1, and the lower emulsion speed is denoted by DIN 2. The adjustable resistor 9 enables, for example, the light output of the photoflash unit to be taken into account. The combination of the resistor 12 and the switch 13 can also be used to take into account the guide number of flash unit or to take into account both the guide number and the film speed.

The value of the resistor 10 can be varied by the resistance varying wiper 14, which has a tail 22 and which is connected to the focusing ring 15. The reference numerals 16 and 17, respectively, denote an arrow on the ring and the distance scale. Tap 22 of wiper 14 is connected to resistance means 9–12 at a connection point intermediate the ends of resistor means 9–12 which are connected to voltage source 7. Tap 22 divides resistance means 9–12 into first resistor means 9, 10 and second resistor means 11, 12. In the wiper position shown in FIG. 1a, the resistor 10 has an initial value of zero. This value corresponds to a distance of $L_0$. The distance $L_0$ is chosen in dependence on the lowest guide number of a flash unit and the slowest film speed that is to be used with the camera.

The collector of the transistor 8 is connected to a resistor 18 and to the base of the transistor 19. A resistor 20 is connected in common to the emitters of the transistors 8 and 19. A warning lamp 21 is connected to the collector of the transistor 19.

The circuit just described operates in the following manner. When a photoflash picture is to be taken, a photoflash unit is inserted into the shoe 2. The lever 4 is consequently pivoted in the direction of the arrow $a$, and the contact 6 is closed. It will be assumed that the camera is set to DIN 1, the switch 13 being open.

If the focusing ring 15 is turned in the direction of the arrow $b$ from its starting position to the position shown in FIG. 1a, the value of the resistor 10 does not change, the value remaining zero. To prevent a change in the resistance value, a contact path 22 is provided.

Figure 1B:
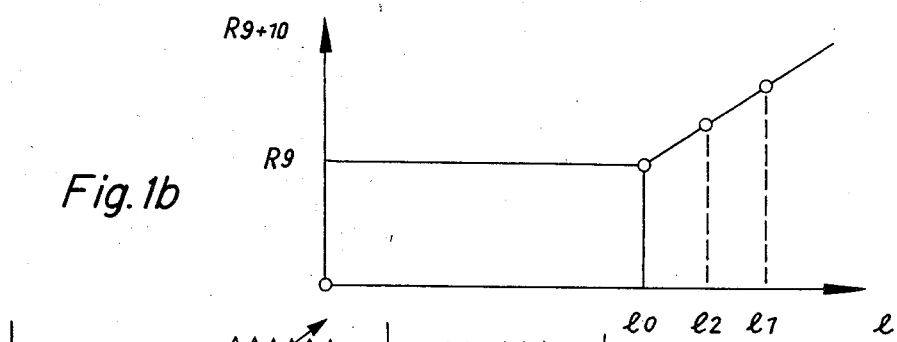
FIG. 1b is a graph showing the change in the total resistance of resistors 9 and 10 independence on the setting of the focusing ring.

The ratio between the resistors 9, 10, and 11 of the voltage divider is, for the time being, determined solely by the values of the resistor 9 and 11. FIG. 1b shows that the total resistance of the resistors 9 and 10 within the distance range from zero to $L_0$ has the value R9. The advantage of this arrangement is that the resistance of the voltage divider increases only beginning at a predetermined setting of the focusing ring, and consequently the voltage divider can be designed to have a desired resistance slope for controlling the trigger stage.

The ratio between the resistors 9 and 11 is so chosen that the transistor 8 conducts and the transistor 19 consequently does not conduct. Therefore, the lamp 21 does not burn. If the focusing ring 15 is turned in the direction of the arrow $b$ past the setting $L_0$, the value of the resistor 10 is added to that of the resistor 9. When the setting $L_1$ is reached, the total resistance of the resistors 9 and 10 is so great that the transistor 8 is cut off and the transistor 19 conducts. The lamp 21 now burns and warns the user of the camera that, in respect of the guide number of the flash unit and the chosen film speed, the upper distance limit has been reached at which a properly exposed picture can still be taken.

Although the invention has been described on the assumption that the warning is to be provided for the upper limit, actually the distance $L_1$ can be either greater or less than $L_0$, depending upon whether a warning is desired for the upper limit or the lower limit at which a well-exposed flash picture can be taken.

If the switch 13 is closed, shunting the resistor 12 across the resistor 11, the camera is set to a film speed DIN 2, which is slower than that to switch the camera was previously set. Since the total resistance of the parallel-connected resistors 11 and 12 is smaller than that of the resistor 11, the threshold voltage of the trigger stage is reached at a smaller total resistance of R9 and R10. Consequently, the lamp 21 will begin to burn at a distance $L_2$ that is smaller than the distance $L_1$. (In the case where a warning is to be provided for the lower limit, $L_2$ will be greater than $L_1$.) In other words, the upper distance limit is lower for DIN 2 than for DIN 1.

If the photoflash unit is removed from the shoe 2, the lever 4 returns to its starting position, the contact 6 opens, and the voltage for source 7 is disconnected.

In accordance with the invention, the total resistance of resistors 9, 10, and 11 can also be chosen that at $L_0$ and any lesser distance, the transistor 8 is cut off and the transistor 19 conducts, the distance $L_0$ and any lesser distance being too small for adequate exposure with a flash unit.

Figure 2:
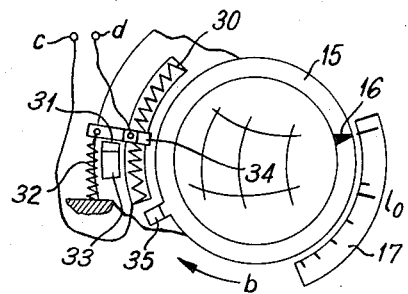
FIG. 2 shows a modification of the variable resistor mounted next to the focusing ring.

FIG. 2 shows a second embodiment of the variable resistor 10. Throughout all embodiments, the reference numerals are the same for all parts having the same function. The variable resistor 30 and the wiper 31 are connected by the respective terminals $c$ and $d$ to the circuit shown in FIG. 1a. The wiper 31 is biased by a spring 32, which holds the wiper against a stop 33 that is rigid with the camera housing. The wiper 31 has a projection 34 that is engaged by a driving shoulder 35 of the focusing ring 15, when the latter is turned in the direction of the arrow $b$. In the position shown in FIG. 2, the driving shoulder has not yet contacted the projection 34. The shoulder 35 engages the projection 34 at the setting $L_0$ of the focusing ring. When the ring 15 is turned further in the direction of the arrow $b$, the driving shoulder forces the wiper 31 to move against the pull of the spring 32, the previously constant value of the resistor 30 increasing continuously. The resistor 30 consequently replaces the two resistors 9 and 10, shown in FIG. 1a. In a manner not shown, the position of the stop 33 is made adjustable so that the constant value of the resistor 30 can be changed as desired.

Figure 3:
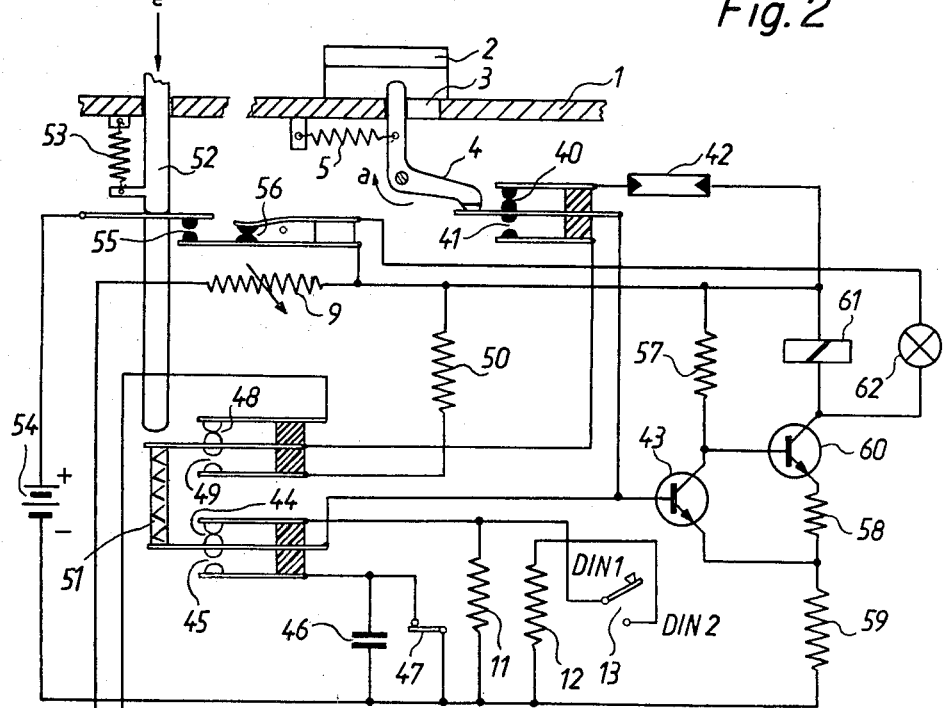
FIG. 3 shows a further embodiment of the invention.
Figure 3:
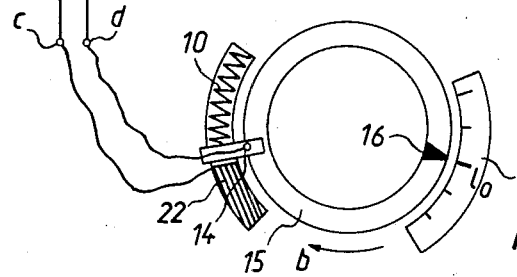

With reference to the embodiment shown in FIG. 3, the lever 4 operates a switch 40, 41, which can connect either a photoresistor 42 or the resistors 9 and 10 in the voltage divider. The contact 40 of the switch 40, 41 connects the photoresistor 42 to the base of the transistor 43. This base is connected by the contact 44 of a further switch 44, 45 with the resistor 11 of the voltage divider. The contact 45 enables a capacitor 46 to be connected into the circuit, the resistor 11 being disconnected from the circuit. A switch 47 enables the capacitor 46 to be shorted. The variable resistor 10 is connected by the contact 48 of a third switch 48, 49 with the contact 41 of the first switch 40, 41.

The contact 49 of the third switch 48, 49 connects a resistor 50, which, together with the capacitor 46, determines the exposure time when taking flash pictures, to the first switch 40, 41. The two switches 44, 45 and 48, 49 are ganged together by a connection bar 51, these two switches being operated simultaneously by an actuator 52. The actuator is biased by a tension spring 53. The actuator 52 also operates a switch 55 that connects a voltage source 54 to the circuit. A further switch 56 is operated by the actuator 52 after a certain time delay.

The collector of transistor 43 is connected to the resistor 57, and the emitter is connected to the junction between two resistors 58 and 59 that are connected in series to the emitter of transistor 60. The collector of transistor 43 is directly connected to the base of transistor 60, the collector of which latter is connected to an electromagnet 61 that controls the operation of the shutter, not shown. A contact 56 connects the lamp 62 in parallel with the electromagnet.

The circuit just described operates in the following manner. It will be assumed that the camera is set to DIN 1, the more sensitive of the two film emulsions. The lever 4 is in the position shown in FIG. 3; and the photoresistor 42 is consequently connected to the base of transistor 43. The resistors 9, 10 and 50 are disconnected from the voltage divider circuit. The actuator 52 is pressed in the direction of the arrow $e$, and the contact 55 is closed. Since the resistance of the photoresistor 42 is relatively small at the assumed subject brightness, the base of transistor 43, because of the ratio between the voltage divider resistors 42 and 11, is positive with respect to the emitter of transistor 43. Consequently, transistor 43 conducts; transistor 60 does not conduct; and the lamp 62 does not burn.

As the actuator 52 is pressed down farther, the contact 56 is opened, the lamp 62 being disconnected from the circuit. Moreover, the contact 48 is opened, and the contact 49 closed. This does not affect shown, circuit. At the same time, the contact 44 is opened and the contact 45 closed, the resistor 11 being disconnected from the capacitor 46 and the photoresistor 42 instead being connected in series with this capacitor. Since the capacitor is still shorted by the switch 47, the transistor 43 is cut off, and the transistor 60 conducts. In a manner not shown the switch 47 is opened when the camera shutter opens, permitting the capacitor 46 to charge. After an exposure period determined by the subject brightness, the transistor 60 is cut off, and the magnet 61 de-energized.

If the subject brightness is not sufficient for hand-held exposures, the lamp 62 burns, since the ratio between the resistances 42 and 11 changes as a consequence of the greater resistance of the photoresistor 42, the transistor 43 now being cut off and the transistor 60 conducting. The burning lamp 62 warns the user of the camera that he must use the photoflash unit to obtain correctly-exposed pictures. If a photoflash unit is inserted into the shoe 2, the lever 4 is pivoted in the direction of the arrow $a$, and the contact 41 of the switch 40,41 is closed. The photoresistor 42 is disconnected; and, instead, the contact 44 of the switch 44,45 and the contact 48 of the switch 48,49 respectively connect resistors 10 and 9 into the circuit. The base of transistor 43 is now connected to the voltage divider 9,10, and 11.

The focusing ring 15 is set to the distance $L_0$. The resistor 10 has a value of zero.

If the actuator 52 is pressed in the direction of the arrow $e$, the voltage source 54 is connected to the circuit. The resistance of the voltage divider is determined by the values of the resistors 9 and 11. The voltage at the base of transistor 43 is sufficiently positive with respect to the emitter to turn the transistor on, thereby turning off the transistor 60 and the lamp 62. If the focusing ring 15 is turned in the direction of the arrow $b$, the value of the resistor 10 is added to that of the resistor 9. When the focusing ring is set to a distance $L_1$, the value of the resistor 10 is such that the voltage at the base of transistor 43 is the same as, or is even negative with respect to, the voltage at the emitter. The transistor 43 is now turned off and the transistor 60 turned on. The lamp 62 burns and warns the user that at the chosen emulsion speed DIN 1 there has been reached the upper distance limit at which a correctly-exposed picture can be taken.

If the focusing ring 15 is set to a distance at which a picture can be taken, the user can press the actuator 52 farther in the direction of the arrow $e$. As previously described, the lamp 52 is disconnected, and the contact 45 is closed for connecting the capacitor 46 into the circuit. At the same time, the contacts 48 and 49 are respectively opened and closed. The resistors 9 and 10 are disconnected from the circuit, and the resistor 50 is connected in series with the capacitor 46, this series connection of the resistor and the capacitor determining, in a known manner, the exposure time while taking a picture with the photoflash unit.

Figure 4:
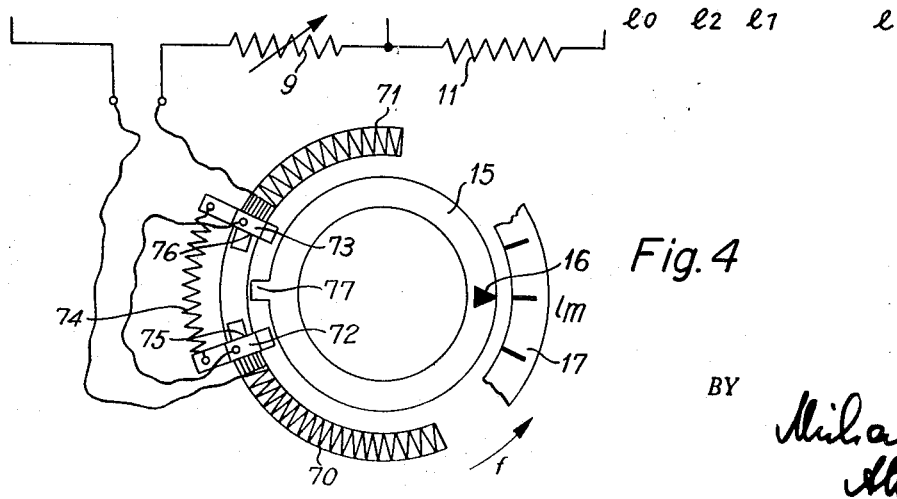
FIG. 4 shows a variation of the invention in which two resistors, one each for the upper and lower distance limits, are mounted next to the focusing ring.

With reference to FIG. 4, an embodiment is shown in which the resistor 10 is replaced by resistors 70 and 71, respectively associated with the lower and upper distance limits at which the photoflash picture can be taken. Within a middle range of distances, neither of the two resistors 70 and 71 affects the circuit, the resistors 9 and 11 alone determining the ratio of the voltage divider. As in the embodiments shown in FIGS. 1$a$ and 3, the voltage divider is connected, in a manner not shown, to the trigger stage. The resistors 70 and 71 are arcuate, and are provided with the respective wipers 72 and 73. The wipers 72 and 73 are biased by a common tension spring 74, which presses the wiper 72 against a stop 74 and the wiper 73 against a stop 76. A projection 77 on the focusing ring 15 enables moving one or the other of the wipers 72 and 73. In the position shown in FIG. 4, the focusing ring is set to a middle distance $L_M$. If the focusing ring 15 is turned in the direction of the arrow $f$, the projection 77, from some predetermined smaller distance on, contacts the wiper 72 and pushes it in the direction of the arrow $f$. The value of the resistor 70, which is zero at the starting position of the wiper, increases with decreasing distance setting of the focusing ring. Resistor 71 is connected in series with resistor 70, and also has a value of zero at the starting position of the wiper 73. When this wiper is moved, the value of resistor 71 becomes larger with increasing distance.

At a predetermined position of the focusing ring — dependent on the chosen film sensitivity and on the guide number of the photoflash unti— the lamp 21 or 62 is turned on, as previously described. The user is warned that he cannot take an adequately exposed picture below the distance indicated by the focusing ring and scale.

If the focusing ring is turned clockwise, from a predetermined distance on the wiper 73 is moved, increasing the value of resistor 71 from a starting value of zero. The value of resistor 70 is zero. At a predetermined upper distance limit, the lamp 21 or 62 lights, as previously described.

In all of the embodiments described, the focusing ring 15 is connected, in a manner not shown, to the diaphragm operating members when a photoflash picture is taken.

It will be understood that each of the elements described above, or two or more together, may also find a useful application in other types of circuits differing from the types described above.

While the invention has been illustrated and described as embodied in an automatic distance warning circuit for cameras to be used with photoflash units, it is not intended to be limited to the details shown, since various modifications and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims. What is claimed as new and desired to be protected by Letters Patent is set forth in the appended claims.

What is claimed is:

1. In a photographic apparatus for use with a photoflash unit, an arrangement for warning the user when the camera is set for a distance outside a predetermined range of distances corresponding to the illumination capability of the photoflash unit, comprising electronic trigger means including control electrode means and an output, and having first and second states; warning means connected to said output of said trigger means for producing a warning signal when said trigger means is in said second state; voltage divider means comprising a voltage source having two terminals, a resistance means having a first end connected to one of said terminals and a second end connected to the other of said terminals, voltage tap means electrically connected to said resistance means at a connection point intermediate said first and second ends of said resistance means and dividing the latter into first and second resistor means and also connected to said control electrode means for applying thereto a voltage at said connection point, and movable resistance-varying means operative for varying the resistance value of at least one of said resistor means with concomitant variation of the voltage at said connection point, said resistance-varying means being movable to and from a triggering position in which it establishes at said connection point a voltage sufficient to trigger and trigger means into said second state thereof; and focussing means movable to a plurality of settings, including a predetermined range of settings, corresponding to different subject distances, said focussing means being mechanically connected with said resistance-varying means and operative for moving the latter to said triggering position in response to movement of said focussing means to a setting outside said predetermined range of settings.

2. The combination as defined in claim 1, wherein said second resistor means is variable in dependence on at least one exposure parameter.

3. The combination as defined in claim 2, wherein said exposure parameter is the guide number of the photoflash unit.

4. The combination as defined in claim 2, wherein said exposure parameter is the emulsion speed of the film.

5. The combination as defined in claim 2, wherein the exposure parameters are the guide number of the photoflash unit and the emulsion speed of the film.

6. The combination as defined in claim 1, further including photo sensitive means; and switch means connected to said first resistor means and to said photo sensitive means for connecting the latter into said voltage divider means in place of said first resistor means when the camera is not adjusted to take a photoflash picture.

7. The combination as defined in claim 1, wherein said first resistor means includes fixed resistor means and variable resistor means, said variable resistor means and said resistance-varying means being so adapted that the resistance value of said first resistor means is invariable over a predetermined range of settings of said focusing means, the resistance value of said first resistor means being varied from a predetermined setting of said focusing means on, said predetermined setting being chosen in dependence on the lowest photoflash unit guide member and on the slowest film emulsion speed that are to be used with the camera, and wherein the resistance value of said first resistor means over that part of the focusing range that it is invariable is of such a value that the voltage at said control electrode means holds said electronic trigger means in one of said first and second states, and further wherein the resistance value of said first resistor means outside of said predetermined range changes sufficiently to trigger said trigger means to the other of said first and second states.

8. The combination as defined in claim 7, wherein said fixed and variable resistor means are separate components connected in series.

9. The combination as defined in claim 7, wherein said resistance-varying means includes a wiper connected to said focusing means to move therewith over said variable resistor means.

10. The combination as defined in claim 9, including resilient means for biasing said wiper to a predetermined position, and wherein said resistance-varying means includes driving means on said focusing means for engaging said wiper and moving the latter against the force of said resilient means.

11. The combination as defined in claim 10, further including stop means at said predetermined position.

12. The combination as defined in claim 10, wherein said fixed resistor means and said variable resistor means are a single component, the resistance of said fixed resistor means being determined by said predetermined position of said wiper.

13. The combination as defined in claim 7, wherein said variable resistor means includes first and second variable resistors, there being a said predetermined setting of said focusing means for each of said first and second variable resistors, and wherein said resistance-varying means includes respective first and second wipers for said first and second variable resistors and driving means on said focusing means for engaging said first wiper when the subject distance is at or below a first predetermined distance to increase the value of the first variable resistor with decreasing subject distance, and for engaging said second wiper when the subject distance is at or above a second predetermined distance to increase the value of the second variable resistor with increasing subject distance, so that said warning indicator means operates whenever the subject distance is too great or too small for adequate exposure by the photoflash unit.

14. The combination as defined in claim 7, including exposure control means for automatically controlling the open time of the shutter means of the camera, said exposure control means including said warning means and said variable resistor means, and further including photosensitive means exposed to light from the subject.

15. The combination as defined in claim 14, wherein said exposure control means includes timing means having a resistor, and further including first switch means connected to said timing means resistor and to said variable resistor means for switching the former or the latter to said control electrode means; and actuator means for operating said first switch means to cause the latter to connect said timing means resistor to said control electrode means when it is shown by said warning means that a photoflash picture can be taken.

16. The combination as defined in claim 15, wherein said timing means further includes a capacitor, and further including second switch means connected to said second resistor means and to said capacitor means for switching the former or the latter to said control electrode means, said actuator means operating said second switch means to cause the latter to connect said capacitor to said control electrode means when it is known by said warning means that a photoflash picture can be taken.

* * * * *